Aug. 23, 1938.   J. M. HUFFMAN   2,127,868
TRAILER STEERING MECHANISM
Filed Nov. 23, 1936   2 Sheets-Sheet 1
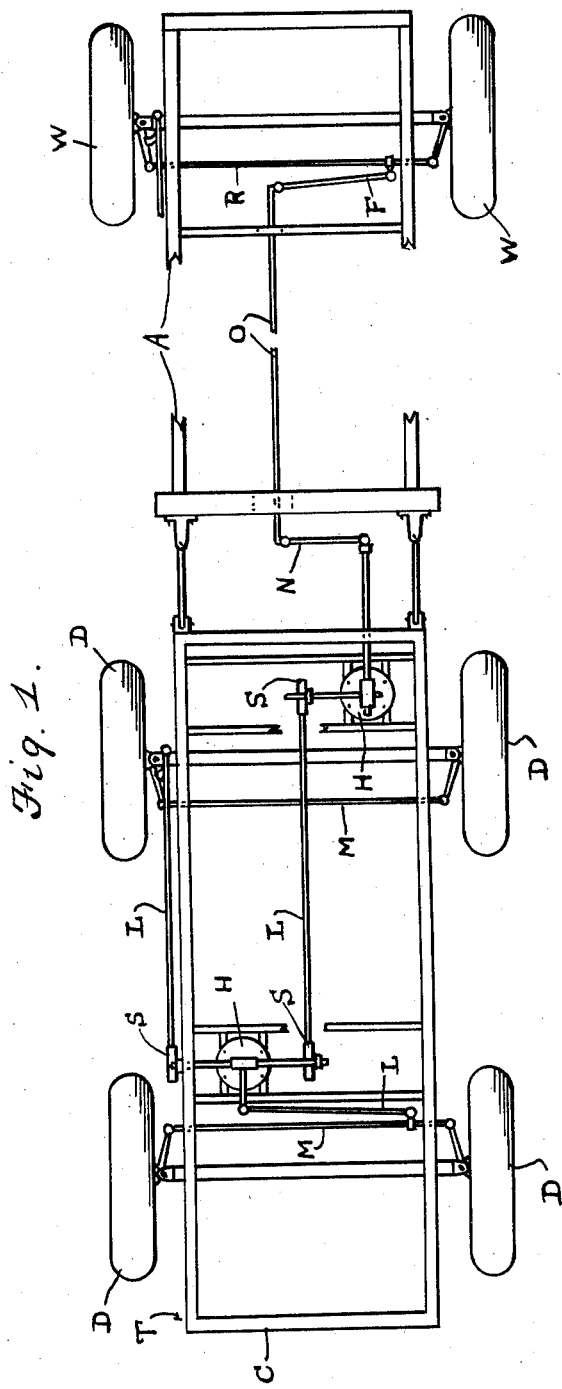
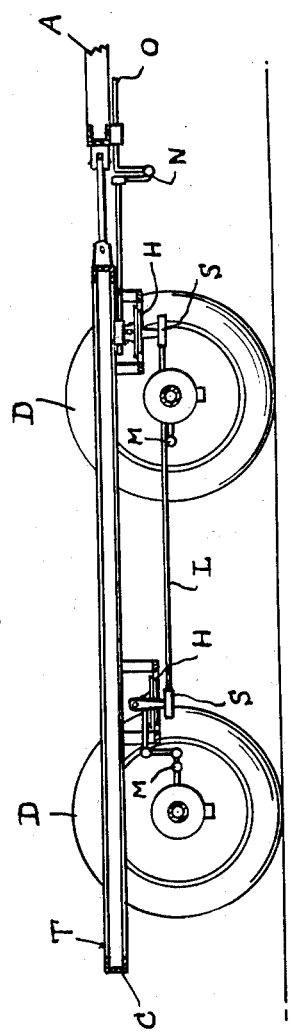
Inventor
James M. Huffman
By L. B. James
Attorney Aug. 23, 1938.　　　J. M. HUFFMAN　　　2,127,868
TRAILER STEERING MECHANISM
Filed Nov. 23, 1936　　　2 Sheets-Sheet 2
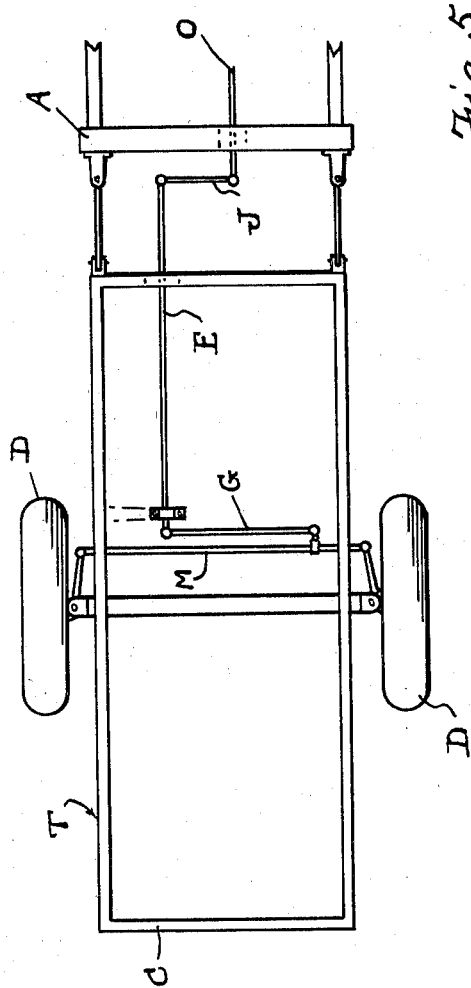
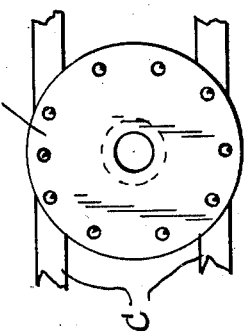
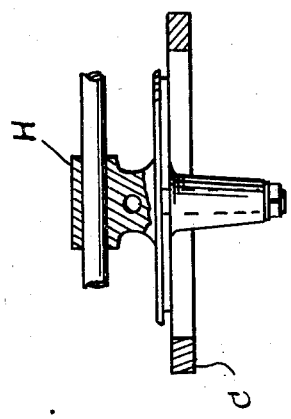
Inventor
James M. Huffman
By L. B. James
Attorney Patented Aug. 23, 1938

2,127,868

UNITED STATES PATENT OFFICE 2,127,868

TRAILER STEERING MECHANISM

James M. Huffman, Orland, Calif.

Application November 23, 1936, Serial No. 112,398

1 Claim. (Cl. 280—33.55)

This invention relates to automobile trailers.

The primary object of this invention resides in the provision of a trailer for automobiles adapted to be steered by the steering mechanism of the automobile to permit backing the same and parking it in limited spaces.

Another object of this invention resides in the provision of a trailer for automobiles having its wheels pivoted and connected to the conventional steering mechanism of the automobile so as to cause the trailer to follow the automobile without dragging the wheels thereof.

A further object of this invention resides in the provision of a trailer for automobiles having pivoted wheels connected to controlling mechanism thereon which is readily hitched to means on the automobile so as to cause the wheels of the trailer to operate in unison with the steering wheels of the automobile.

A still further object of this invention resides in the provision of a trailer for automobiles having pivoted wheels adapted to be controlled by a plurality of coacting elements operatable by the conventional drag-rod of the steering wheels of the automobile.

With these and other objects in view this invention resides in certain novel features of construction and arrangement of elements to be hereinafter set forth in the specification, illustrated in the accompanying drawings and pointed out in the appended claim and, while the disclosure herein set forth depicts my present conception of this invention, the right is reserved to resort to such changes in construction and arrangement of elements as come within the scope of the claim.

In the accompanying drawings forming a part of this application:

Fig. 1 is a plan view of a trailer as constructed in accordance with this invention and connected to the chassis of an automobile.

Fig. 2 is a side view thereof with the near wheels removed to better illustrate the invention.

Fig. 3 is a plan view of a modified form of trailer.

Fig. 4 is a vertical sectional view of one of the steering heads.

Fig. 5 is a plan view thereof.

In the present illustration of this invention the letter A designates the chassis of a conventional automobile which, among other elements, consists of the usual steering wheels W connected by the common drag-rod R.

Suitably secured to the chassis of the automobile is a trailer T which in the present instance and as illustrated in Figs. 1 and 2 consists of a chassis C supported by pivoted wheels D, the same being preferably connected by drag-rods M similar to the conventional drag-rod used for the automobile steering wheels.

Secured on the chassis of the trailer in any well-known manner are journaled steering heads H which are connected to the drag-rods M of the trailer wheels and to one another by suitable links L, certain of which are provided with adjustment sleeves S to compensate for wear and to establish accurate alignment and manipulation of the wheels.

Secured in suitable brackets beneath the automobile and connected at its forward end as by a link F to the drag-rod R of the automobile steering wheels is an axially rotatable crank-arm O having its rear end similarly connected to the foremost steering head of the trailer by a link N.

Through the instrumentality of the aforesaid mechanism it is apparent steering of the automobile wheels when manipulated by the conventional steering mechanism of the automobile (not shown) will cause the crank arm O to rotate whereupon this movement will be transmitted to the foremost steering head of the trailer and thus cause the rear steering head to manipulate the wheels of the trailer in the proper direction through the instrumentality of the aforesaid links.

In Fig. 3 is illustrated a trailer provided with two pivoted wheels which are manipulated in unison by a longitudinally extending crank arm E carried thereby and connected at its rear end to the drag-rod M thereof by a suitable link G and at its front end to the aforesaid crank arm of the automobile by a similar link J and, through this assemblage of elements, the steering heads are dispensed with and manipulation of the pivoted wheels D is effected in accordance with the operation of the steering wheels W of the automobile.

With this invention fully set forth it is manifest that means have been provided whereby a trailer is readily steered to follow the automobile to which it is hitched and thereby obviates the tendency of dragging the wheels thereof while rounding curves.

Having thus described my invention what I claim and desire to protect by Letters Patent is:

The combination with an automobile and its steering mechanism, a trailer having front and rear sets of steering wheels, steering mechanism for each set of wheels, rotatable steering heads secured on the trailer below the horizontal plane occupied by the chassis of the trailer, one of said steering heads being disposed adjacent the rear axle of the trailer and the other adjacent the front axle of the trailer on opposite sides of a line passing longitudinally through the center of the trailer, a link disposed on a line passing through the longitudinal center of the trailer with its opposite ends connected to the steering heads, links projecting from the rear steering head to the steering mechanism of both sets of wheels of the trailer, and means connecting one of the steering heads to the steering mechanism of the automobile.

JAMES M. HUFFMAN.